(Model.)
2 Sheets—Sheet 1.
M. D. TEMPLE.
Windmill.
No. 236,194.
Patented Jan. 4, 1881.
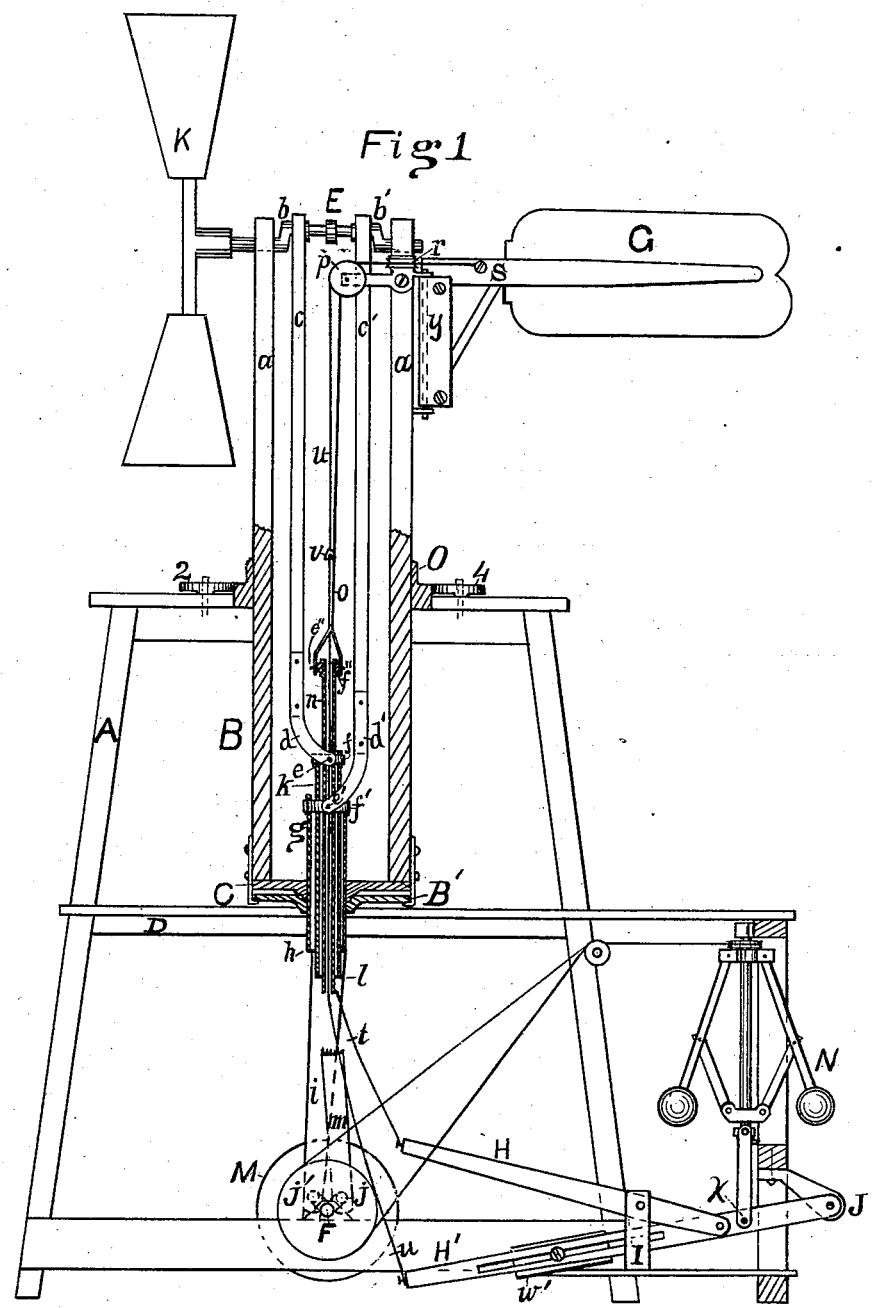
WITNESSES.
A. M. Stout
P. H. Stochel
INVENTOR.
Morris D. Temple
By W. Zimmerman
Atty (Model.)
2 Sheets—Sheet 2.
M. D. TEMPLE.
Windmill.
No. 236,194.
Patented Jan. 4, 1881.
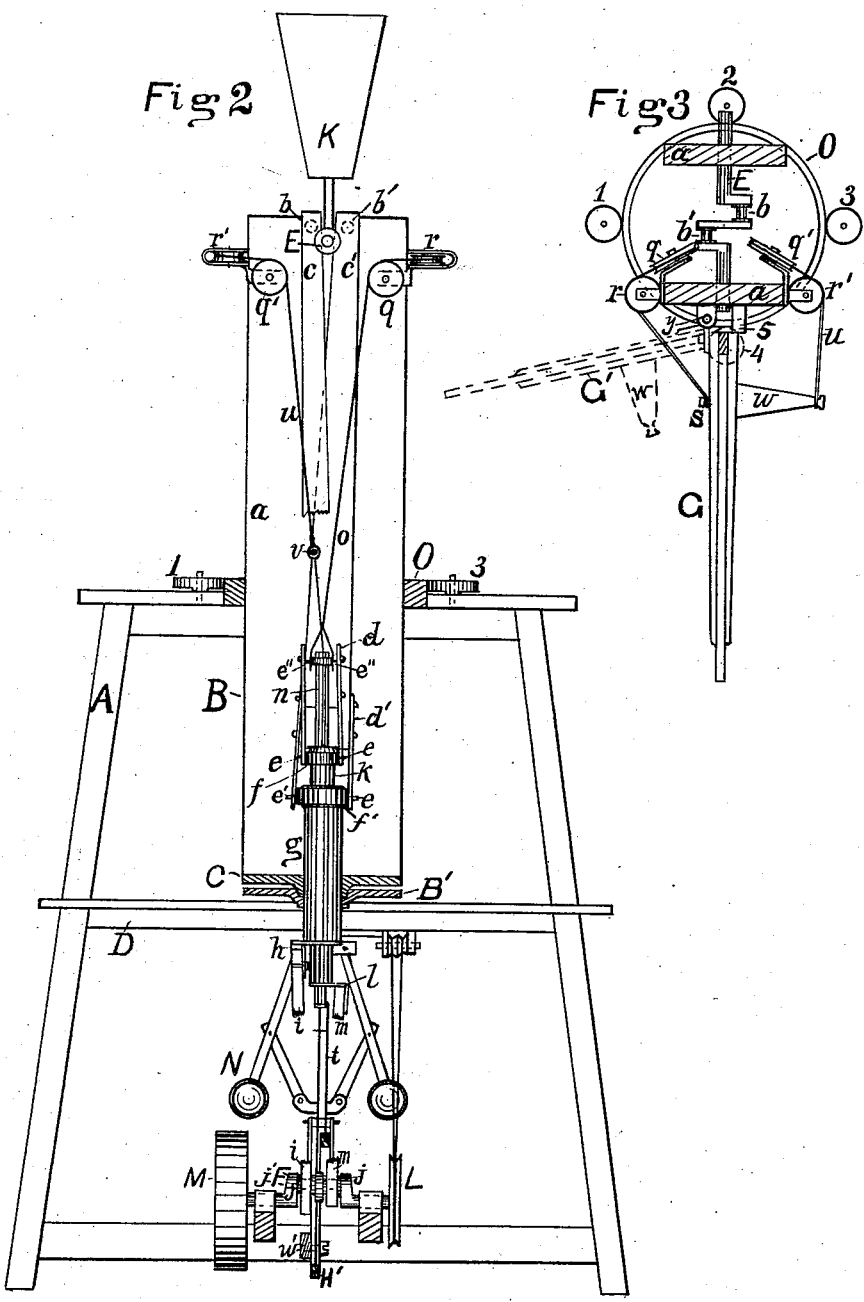
WITNESSES.
A. M. Stout
P. C. Ströckel
INVENTOR.
Morris D. Temple
By Wm. Zimmerman
Atty.

UNITED STATES PATENT OFFICE.

MORRIS D. TEMPLE, OF CHICAGO, ILLINOIS.

WINDMILL.

SPECIFICATION forming part of Letters Patent No. 236,194, dated January 4, 1881.

Application filed March 1, 1880. (Model.)

*To all whom it may concern:*

Be it known that I, MORRIS D. TEMPLE, of Chicago, in the county of Cook and State of Illinois, have invented certain new and useful Improvements in Windmills; and I hereby declare the following to be a full, clear, and exact description thereof, which will enable others skilled in the art to which my invention appertains to make and use the same, reference being had to the accompanying drawings, forming a part hereof, and in which—

Figure 1 represents a side elevation of the same, partly in section, so as to fully show the operating parts. Fig. 2 represents a front elevation, also partly in section; and Fig. 3 represents a plan view, showing the method of attaching and operating the vane or tail in combination with the governor of the mill.

Like letters of reference indicate like parts.

My invention relates to that class of windmills by means of which continuous rotary motion is imparted to a driving-pulley or other mechanism so placed as to be readily attached to any fixed machinery, while at the same time the shaft of the wind-wheel which imparts motion to said mechanism may rotate in the horizontal plane of its axis; and it further consists in so connecting a governor to the mechanism, in combination with the tail-vane of a windmill, as to cause it to turn into or out of the wind in such manner as to receive therefrom at all times a steady and uniform motion; and in the combination and arrangement of the several parts, as hereinafter more fully described and claimed.

In the drawings, A represents the tower, through the center of which rises a vertical turning post, B, which may be made of two planks, $a\ a$, as shown, or otherwise; the lower end of which is stepped into annular step-plates C and B' upon a fixed support, D, said support being attached to the posts of the tower at a suitable distance below the top, so as to give the post B firm support, while at the same time it may revolve freely.

To the upper end of the post B is attached a double-crank shaft, E, with its cranks $b\ b'$ placed preferably at right angles to each other and between the supports $a\ a$.

To the crank $b'$ is attached a pitman-rod, $c'$, and to each side of the lower end of this pitman-rod are attached claws $d'$, which take hold on pins $e$ of the annular ring or collar $f'$. Said ring $f'$ is held at the upper end of a tube, $g$, by fixed collars immediately above and below it, so as to allow it to turn freely as a swivel between them. The tube $g$ passes through and moves freely in the opening of the annular step-plates B' C, which form a guide for it, and is made of a length sufficient to prevent the angle-piece $h$, firmly attached thereto, from striking the lower part of the step B' as it is drawn upward by the motion of the crank $b'$.

To the angle-piece $h$ is attached the connecting-rod $i$, which takes hold of the crank $j'$ of the double-crank shaft F, held in fixed bearings.

To the crank $b$ is attached the pitman-rod $c$, provided with claws $d$, taking hold of pins $e$ on an annular ring or swivel, $f$, which works on the upper end of a tube, $k$, in the same manner as ring $f'$ on tube $g$, and said tube $k$ slides closely but freely within the tube $g$.

To the lower end of the tube $k$ is also firmly attached an angle-piece, $l$, to which is attached the connecting-rod $m$, which takes hold of the other crank, $j$, of shaft F. The end of tube $k$ must pass beyond that of tube $g$ below, so as to allow a reciprocating motion of the tubes within each other. The united length of the upper and lower pitman-rods and their connecting tubes between each, respectively, from center to center of crank-pins is equal to the vertical distance between the axes of the crank-shafts.

Within the tube $k$ freely slides the tube $n$, and is of a length sufficient to prevent its ends interfering with those of the tube $k$ in its motions. This tube $n$ is also provided with a freely-rotating annular ring or swivel, $f''$, provided with pins $e''$. These pins are attached, by means of a bail or strap, to a wire or chain, $o$, which passes upward and over the fixed guide-pulleys $q$ and $r$, thence around and back to the arm of the vane G, to which it is attached at a point, $s$.

To the lower end of the tube $n$ is also attached the cord or wire $t$, which passes downward, and is attached to the outer end of the compound lever H.

Through the tube $n$ passes the wire $u$, provided with a swivel, $v$, the upper part of which passes up and around the fixed guide-pulleys $q'$ $r'$, and backward to a horn, $w$, on the arm of the vane G, to which it is fastened. The other end of the wire passes downward, and is attached to the end H' of the other part of the compound levers, and the length of the wires $o$ and $u$ is so adjusted that when the vane G is at its normal position the free end of the lever H shall be at its extreme height and that of H' at its lowest point.

The lever H is fulcrumed on the post I, and its shorter end fastened to H, near the governor, and lever H' to the bracket J. The lever H' is also provided with an adjustable weight, $w'$, and to said lever, at $x$, is attached a common ball-governor, N, arranged and driven in the usual way by means of a belt from the pulley L on shaft F.

The vane G is hung upon a hinge, $y$, so as to swing freely in a horizontal plane.

The post B is provided with a ring, O, at the top of the tower, against which the fixed rollers 1 2 3 4 are placed, so as to hold it vertical, and at the same time allow it to turn freely.

The operation of my improved windmill is as follows: Motion being given to the wind-wheel K, and thereby to the crank-shaft E and pitman-rods $c$ $c'$ connecting with the lower crank-shaft F, the shaft F will turn in this case in the opposite direction with that of the shaft E, for, the double cranks of both shafts being right-angled with reference to each other, it will be observed that when one of the cranks of shaft E is at its dead-point the other will be at its greatest power, and that the cranks of shaft F below are situated in the same position, so that whatever positions the cranks of shaft E take the corresponding one on shaft F will be similarly placed; hence there can be no dead-points, and continuous rotary motion of the shaft F results. The pitman-rods $c$ and $c'$ and cords $u$ and $t$, being free to turn on their swivels $f$, $f'$, $f$, and $v$, allow the axle E to turn freely in all directions in its horizontal plane of revolution without disturbing or disarranging the movements of the shaft F, to which they are connected below. Motion may therefore be given to any machinery by connecting it with a belt from the pulley M on shaft F.

The operation of the governor N, belted to the pulley L and deriving its motion from the wind-wheel, is as follows: The cord $u$ is attached to the outer end of the lever H' and horn $w$ of the vane G. The lever H', being weighted, swings the vane on its hinge $y$ until it strikes a stop, 5, so placed as to hold the tail-vane at right angles to the plane of rotation of the wind-wheel K, thus holding the wind-wheel fully to the wind. As the wind increases increased speed is given to the machinery, causing the balls of the governor to rise and raise with them the outer end of the part H' of the compound levers and correspondingly depress the part H, to which the cord $t$ is attached, thus pulling down on the cord $t$, and so turning the vane G around into the position shown by the dotted outline G'; but the wind constantly tends to turn the vane into the plane of its direction, and consequently the post B will turn in proportion to the action of the governor, and, as the force of the wind increases, decrease its action on the wheel by turning its face from the wind until it becomes parallel, or nearly so, with the vane, when the wind strikes it only at its edge, and into which position the wheel may be placed at any time by raising the lever H' and securing it, which causes the wind-wheel to stop.

The wheel K may be held to the wind with considerable force by sliding the weight $w'$ toward the outer end of the lever H' when greater power is wanted, and may so be regulated with great nicety.

The kind of wind-wheel preferably used is of that class in which the sails are fixed and form a rigid wheel.

It is not absolutely necessary that the cords $t$ and $u$ should be swiveled. They will, of course, wear out sooner; but such construction is also more economical. I prefer to have them swiveled, as shown.

It is obvious that with my swiveled concentric connecting tubes between the ends of the connecting-rods, as shown, the number of cranks or their equivalents on the shafts E and F may be increased, if desired.

Having thus explained my invention, what I claim as new is—

1. The combination of the double-crank shafts E and F, connected by pitman-rods $c$ and $c'$, swiveled at their lower ends to tubes concentric within each other, and connected by connecting-rods $i$ and $m$ to the cranks of shaft F, substantially as shown and described.

2. The governor N, attached to the compound levers H H' and connected to the vane of a wind-wheel, and operated substantially as shown and described.

3. A series of independent concentric swiveled tubes, each connected by a pitman-rod to one of an equal series of cranks arranged upon a crank-shaft turning upon its own or longitudinal axis and around an axis at right angles thereto, and by connecting-rods attached to and driving a shaft provided with a corresponding series of cranks.

4. A wind-wheel operating the double-crank shafts E and F, one of which is connected to and driven by the other of said shafts by means of swiveled connecting-rods, in combination with the governor N and hinged tail-vane G, connected by swiveled cords $o$ and $u$, all operated substantially as and for the purpose as shown and described.

MORRIS D. TEMPLE.

Witnesses:
A. M. STOUT,
WM. ZIMMERMAN.